United States Patent
Perlman

(10) Patent No.: US 6,742,182 B1
(45) Date of Patent: May 25, 2004

(54) DESCRAMBLING A SCRAMBLED TELEVISION SIGNAL USING A CABLE BOX FOR AUTHENTICATION

(75) Inventor: Stephen G. Perlman, Palo Alto, CA (US)

(73) Assignee: Webtv Networks, Inc., Mountain View, CA (US)

( * ) Notice: Subject to any disclaimer, the term of this patent is extended or adjusted under 35 U.S.C. 154(b) by 0 days.

(21) Appl. No.: 09/490,427

(22) Filed: Jan. 24, 2000

(51) Int. Cl.$^7$ ................................................. H04N 7/16
(52) U.S. Cl. ............................. 725/25; 725/27; 725/28; 725/31; 725/132; 725/140; 725/152; 380/210; 348/552
(58) Field of Search .................................. 380/200–203, 380/210; 725/25, 27–31, 139–141, 151–153, 131–133, 119, 120; 348/552

(56) References Cited

U.S. PATENT DOCUMENTS

| | | | | |
|---|---|---|---|---|
| 4,928,309 A | * | 5/1990 | White | 380/15 |
| 5,742,680 A | | 4/1998 | Wilson | 380/16 |
| 5,852,290 A | | 12/1998 | Chaney | 235/492 |
| 5,862,219 A | * | 1/1999 | Glaab | 380/210 |
| 6,175,861 B1 | * | 1/2001 | Williams et al. | 709/217 |
| 6,188,448 B1 | * | 2/2001 | Pauley et al. | 348/731 |

* cited by examiner

Primary Examiner—Victor R. Kostak
Assistant Examiner—Ngoc Vu
(74) Attorney, Agent, or Firm—Workman Nydegger

(57) ABSTRACT

Methods, apparatus and computer program products for authenticating the right of a user to descramble and view scrambled television channels are provided. The set top box can use newer and faster technology to tune and descramble television channels and the right of the user to descramble those channels is authenticated by periodically examining all the television channels output by a cable box. If the cable box descrambles a particular channel, the right of the user to descramble that channel has been authenticated or verified and the set top box is enabled to descramble the same channel. As an additional security feature, the time base of the television channel output by the cable box can be compared to the time base of the same channel tuned and descrambled with the set top box. If the time bases match, then the right of the user to descramble and view that particular channel is authenticated. Once the right of the viewer to descramble a particular channel is authenticated, the channel is tuned and descrambled using the newer technology of the set top box. In this manner, the set top box can descramble and tune scrambled television channels without compromising the rights of the company supplying the scrambled television signal.

35 Claims, 3 Drawing Sheets

DESCRAMBLING A SCRAMBLED TELEVISION SIGNAL USING A CABLE BOX FOR AUTHENTICATION

BACKGROUND OF THE INVENTION

1. The Field of the Invention

The present invention relates to descrambling television signals. More specifically, the present invention relates to descrambling scrambled television signals at an electronics device in an entertainment system using a cable box to verify that the viewer has been granted access to the descrambled signals.

2. The Prior State of the Art

In today's society, people are spending more time watching television. The demand for more television has led to the creation and development of television channels dedicated to news, sports, movies and special events. A few of these channels, including those affiliated with the major networks, are free and viewers can receive these channels by simply erecting and connecting an antenna to their television. The downside of using an antenna is that only a few channels can be received and the reception is not always clear. In order to receive a larger selection of television channels, the viewer must subscribe to services offered by a cable or satellite television provider.

When a viewer subscribes to television services from a cable or satellite operator, the viewer typically selects a television channel package. The least expensive package usually contains a basic set of television channels, while the more expensive packages contain premium television channels, examples of which include movie channels and pay-per-view programming. Premium channels are typically scrambled and consumers pay an additional amount in order to be able to descramble and view those channels. Those consumers that do not choose the more expensive television channel packages receive the premium channels in the scrambled and unviewable format. In some cities, some or all of the basic television channels are scrambled in addition to premium channels.

In many instances, a viewer needs a cable box in order to receive cable television channels. The cable box receives signals corresponding to all of the cable television channels, but is configured to descramble only the premium channels that the consumer has purchased. When a viewer subscribes to, modifies, or cancels cable service, the cable operator programs the cable box to descramble the appropriate channels. Cable boxes can be programmed manually by a technician or remotely by sending a conditional access signal from the cable head end to the cable box.

While cable boxes perform important functions, such as those described above, they introduce complexity into home entertainment systems, particularly when combined with other consumer electronics devices, such as video tape recorders or set top boxes (STBs) that provide access to the Internet or other services. One problem is related to the act of changing channels. For example, if a cable box is connected to certain types of set top boxes and the consumer desires to change the channel, a code is sent to the STB and then relayed to the cable box. The cable box then tunes the channel and, if necessary, descrambles the channel so that the user may view the selected channel. In other words, every time a person wants to change channels, the signal must be relayed, thereby introducing delay into the process. If a user selects a specific channel, the process of relaying a command signal might be executed repeatedly. For example, if a user selects channel 104, four codes are relayed to the cable box: the digits "1", "0", "4" and the enter command.

Adding to this delay is the fact that many cable boxes include hardware or software that is outdated. While newer technologies can change, tune and descramble channels faster than many legacy cable boxes, cable operators often find it infeasible to replace such cable boxes with newer ones. The combination of these factors results in a noticeable delay when a person is rapidly changing channels or channel surfing. Further delay can be introduced by some legacy cable boxes that are incapable of skipping unused channels as the user incrementally advances through the channels in the television signal.

Another concern, from the point of view of the cable television provider, is that there are publicly accessible algorithms that permit viewers to descramble many or all scrambled television signals without authorization to do so. The availability of such descrambling algorithms permits viewers to have access to and view scrambled television channels without payment. It would be desirable, therefore, to enable scrambled signals to be descrambled using newer and faster technology without merely replacing legacy cable boxes with new cable boxes. It would be particularly desirable to provide such efficient descrambling capabilities while conforming to access control measures implemented by cable and satellite television providers to allow only authorized subscribers to receive premium channels.

SUMMARY OF THE INVENTION

The present invention relates to descrambling television signals in a device other than the traditional cable box, while using conditional access settings contained in a viewer's cable box to authenticate that the viewer has been granted permission to receive the descrambled channels. In this manner, signal descrambling can be conducted using efficient algorithms and new, relatively fast processors without the risk of the viewer gaining access to unauthorized channels. Cable operators do not need to replace legacy cable boxes with new ones, but can continue to use existing cable boxes as authenticators for the right of the viewers to receive the descrambled channels.

According to one implementation of the invention, in order to determine whether a viewer is authorized to view descrambled channels, the descrambling device (i.e., the electronics device in which descrambling is to be performed) periodically causes the cable box to cycle through at least some of the scrambled channels in the cable television signal. The descrambling device monitors the output signal of the cable box and determines, for each scrambled channel, whether the cable box has generated a descrambled signal. When the cable box outputs a descrambled signal, the descrambling device determines that the cable box is capable of descrambling the scrambled channel and infers that the cable television provider has granted the viewer access to the channel. Conversely, when the cable box outputs a scrambled channel, the descrambling device determines that the cable box is not capable of descrambling the scramble channel and infers that the cable television provider has not granted the viewer access to the channel. In this manner, the descrambling device uses the existing cable box as an authenticator for the right of the viewer to access particular scrambled channels. Based on the results of the foregoing authentication process, the descrambling device is enabled to descramble the channels to which the viewer has been granted access and is disabled from descrambling the channels to which the viewer has not been granted access.

The authentication process can be repeated as desired to remain current with any change in the subscription status of the viewer. For instance, the process can be performed daily during the early morning hours or at another time that is unlikely to interfere with the viewing habits of the user. After the authentication process, when the viewer, by means of a remote control device or otherwise, issues a command to tune to a scrambled channel, the descrambling device rather than the cable box descrambles the channel, assuming that the descrambling device has determined that the viewer is authorized to receive the channel. Thus, scrambled signals are descrambled using the relatively fast descrambling hardware and software of the descrambling device, thereby reducing the delay that might otherwise be present, while preserving the ability of the cable operator to impose conditional access to premium channels.

The invention can advantageously include further techniques to prevent viewers from circumventing the authentication process. As described above, the authentication process relies on monitoring the output signal of the cable box to determine whether it includes a scrambled or descrambled signal. Theoretically, a particularly persistent user could tamper with the authentication process by replacing the scrambled output of the cable box with a non-scrambled, albeit different, television signal. Without some further security measures, the descrambling device might falsely interpret the substituted, non-scrambled signal as an indication that the user is authorized to access the scrambled channel.

In order to detect such attempts to breach the security features of the invention, the descrambling device can compare the timing of cyclical characteristics of a known instance of a particular descrambled signal with the cyclical characteristics of the output signal of the cable box. For example, the descrambling device descrambles a particular scrambled signal and monitors the timing of the vertical blanking interval or another selected cyclical characteristic of the signal. During the authentication process, the cable box outputs a non-scrambled channel that is supposedly the same as the aforementioned channel that has been descrambled by the descrambling device (but not yet conclusively the same in view of the possibility that the user has tampered with the process). The descrambling device monitors the timing of the vertical blanking interval or another corresponding cyclical characteristic of the non-scrambled output signal. If the two signals are synchronized, it is highly probable that the two signals are the same and that there has been no attempt to circumvent the authentication process, whereas non-synchronization indicates possible user interference.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
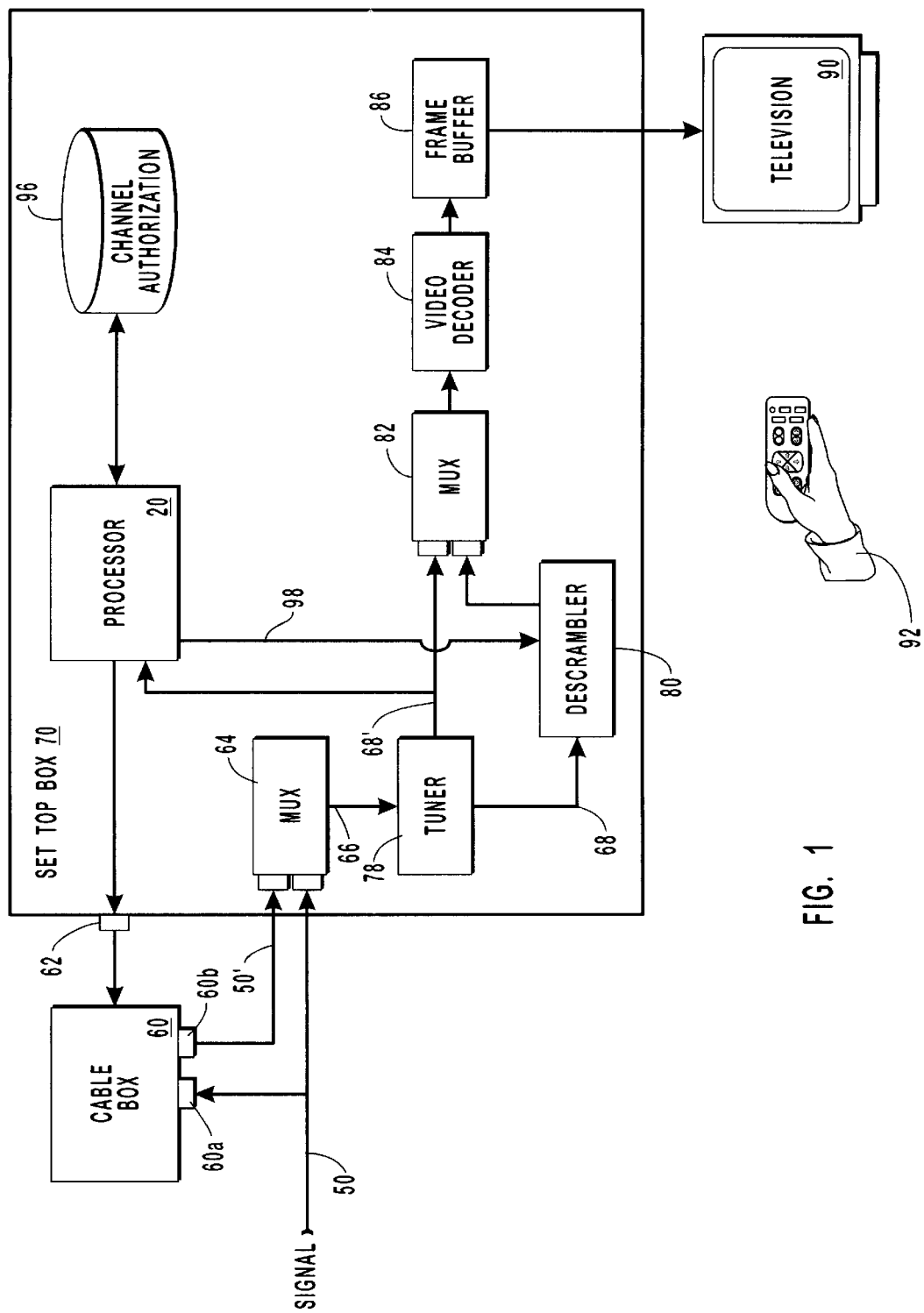
FIG. 1 is a block diagram illustrating one embodiment of a system for authenticating the privilege of a viewer to receive a specified channel and for descrambling and viewing the scrambled signal.

The present invention provides an apparatus, method and computer program product for descrambling a scrambled television signal at a descrambling device other than a traditional cable box. The present invention further contemplates monitoring an output signal from a conventional cable box to determine whether the viewer is authorized to access descrambled television channels. Thus, viewers can take advantage of improved tuning and descrambling capabilities without having to obtain a new cable box. Moreover, using the existing cable box as an authenticator for the viewer's privilege of accessing scrambled channels allows cable operators to retain control over the type and number of channels received by subscribers.

The invention is described in terms of diagrams and flow charts. Using the diagrams and flow charts in this manner to present the invention should not be construed as limiting its scope. The embodiments of the present invention may comprise a special purpose or general purpose computer comprising various computer hardware.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general purpose or special purpose computer, such as one included in a set top box. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Although not required, the invention can be described in the general context of computer-executable instructions, such as program modules, being executed by one or more processors included in a set top box. Generally, program modules include routines, programs, objects, components, data structures, etc. that perform particular tasks or implement particular abstract data types. Moreover, those skilled in the art will appreciate that the invention may be practiced with other computer system configurations, including general purpose computers, personal computers, hand-held devices, multi-processor systems, microprocessor-based or programmable consumer electronics, network PCs, minicomputers, mainframe computers, and the like.

A. Signal Descrambling

FIG. 1 is an example of an apparatus for descrambling a scrambled signal and authenticating the right of a user to access the descrambled signal. Signal 50, illustrated in FIG. 1, may comprise a single signal or a group of signals, some of which may be scrambled. As described herein, signal 50 is a cable television signal and comprises a group of signals referred to as channels. For convenience, the television signals and the associated hardware are described herein in the context of cable television. However, it is to be understood that the principles disclosed herein are applicable to other systems for delivering television signals to viewers, including direct broadcast satellite and other satellite television systems. Indeed, the term "cable box" is defined to include descrambling boxes conventionally used with satellite dishes or with other sources of scrambled television signals.

Some or all of the channels in signal 50 may be scrambled, which means that user 92 is unable to view the content of the scrambled channels on television 90 without a descrambling process. Other channels in signal 50 might not be scrambled and are directly viewable by user 92 on television 90. Cable box 60 can be any conventional or legacy cable box that is capable of descrambling one or more channels in signal 50. Indeed, an advantage of one embodiment of the invention is that scrambled channels can be efficiently descrambled without replacing the existing cable box 60.

According to conventional techniques, and in the absence of the present invention, signal 50 would be tuned and, if needed, descrambled by cable box 60. Cable box 60 receives signal 50 through cable box input 60a and outputs the tuned and descrambled signal 50' via cable box output 60b. Signal 50 may have unused bandwidth that can accommodate future channels. Depending on the nature of cable box 60, it might attempt tuning to the unused channels, although no meaningful image will be displayed on television 90. Cable box 60 is capable of descrambling the scrambled channels in signal 50 only if user 92 is authorized to view the channels. For instance, user 92 is authorized to view scrambled premium channels if the user has purchased these channels from the cable television provider. The cable provider typically selectively enables cable box 60 to descramble the scrambled channels by employing a technician who manually configures the cable box or by remotely programming the cable box using a conditional access system.

According to one embodiment of the invention, set-top box 70 is included in the entertainment system as illustrated in FIG. 1. As used herein, the term "set-top box" extends to any electronics device performing the functions or having the structure disclosed herein, regardless of the position of the electronics device with respect to television 90. Indeed, in one embodiment, set-top box 70 can be integrated with television 90, while in another embodiment set-top box 70 can be a separate component. A WebTV™ set-top box (available from WebTV Networks, Inc., of Mountain View, Calif.) that has been adapted to perform the methods disclosed herein can be used as set-top box 70.

Set top box 70 improves the response time that would otherwise be needed to change channels in the absence of the present invention. According to the embodiment illustrated in FIG. 1, set top box 70 includes a multiplexor 64 that multiplexes signal 50 and signal 50'. Although one of the advantages of this embodiment of the invention is that set top box 70 can tune to and descramble channels without the direct assistance of cable box 60, multiplexor 64 allows set top box 70 to alternately display channels that have been tuned and descrambled by cable box 60. Multiplexor 64 is an example of means for receiving a scrambled signal 50 or signal 50'.

Multiplexor 64 sends the multiplexed signal 66 to tuner 78. When set top box 70 is used to tune to a selected channel, tuner 78 tunes to the channel. Tuner 78 can receive signal 50 directly from the cable operator and tune to the selected channel without the direct assistance of cable box 60. Tuner 78 then retransmits tuned signal 68 to descrambler 80, where the selected channel is descrambled, if needed. The descrambled signal is then transmitted to multiplexor 82. If set top box 70 is instead used to merely display channels tuned and descrambled by cable box 60, tuner 78 tunes to the output channel of cable box 60 (e.g., channels 2, 3, or 4). In this case, tuner 78 sends signal 68' (which can be substantially similar to signal 50') to multiplexor 82. Video decoder 84 and frame buffer 86 assist in displaying the channels in signal 50 on television 90.

Tuner 78 and descrambler 80 can be selected to provide tuning and descrambling capabilities at any available, desired processing speed. Because set top box 70 may be used in combination with any legacy cable box 60 in the possession of the user of the system, the tuning and descrambling response time may be significantly greater than that of the cable box. Those skilled in the art, upon learning of the disclosure made herein, will understand the tuning and descrambling hardware and software included in tuner 78 and descrambler 80. Indeed, tuning and descrambling techniques used in state-of-the-art cable boxes can be used in set top box 70, if desired. Thus, set top box 70 rather than cable box 60 can be used to tune and descramble television signals when viewer 92 watches television.

It can be expected that new scrambling and descrambling algorithms will be introduced over the years. Accordingly, one embodiment of the invention includes the capability for upgrading the descrambling algorithms used by descrambler 80. For instance, if an existing descrambling algorithm is revised to operate more efficiently, the revised algorithm can be uploaded to set top box 70. Moreover, if an entirely new scrambling and descrambling technique is developed, the new descrambling algorithm can be transmitted to set top box 70.

Those skilled in the art, upon learning of the disclosure made herein, will recognize that there are many available methods for upgrading software in a set top box. For instance, the software can be transmitted over telephone lines or an other communications link from a remote software repository to set top box 70. Alternatively, manual upgrading techniques performed by the user are possible. In the case of remote upgrades, the software can be automatically upgraded periodically or as new or revised algorithms become available. Alternatively, new or upgraded descrambling algorithms can be transmitted to set top box 70 on an "as needed" basis. For instance, if set top box 70 encounters a television signal that is descrambled using an unknown algorithm, set top box 70 can initiate communication to a remote software repository using a telephone line or another communications link. In response, algorithms that are appropriate for descrambling the particular television signal can then be uploaded to set top box 70.

The example of FIG. 1 illustrates an embodiment of the invention wherein set top box 70 can tune to and descramble a signal without the direct assistance of cable box 60 and, alternately, can display channels tuned and descrambled by cable box 60. In an alternative embodiment, set top box 70 can be further simplified so as to be incapable of displaying channels tuned and descrambled by cable box 60. In either case, however, cable box 60 is retained in the system to provide the authentication features disclosed hereinbelow.

B. Authentication of Viewing Privileges

While set top box 70 as disclosed above can advantageously tune to and descramble channels from signal 50, it is typically desirable to enable such tuning and descrambling only for viewers who are authorized to gain access to the descrambled channels when, for example, a viewer has subscribed to a cable package having premium channels. While most cable operators have manual or automated conditional access systems that selectively enable cable box 60 to descramble scrambled channels, such conditional access systems may not be directly compatible with set top box 70. In other words, cable operators may not have the infrastructure to remotely interact with set top box 70 in order to restrict access to scrambled channels. In view of the desirability to enable only authorized viewers to gain access to scrambled channels, a preferred embodiment of the invention uses existing cable box 60 to authenticate the access privileges of the user with respect to scrambled channels.

One embodiment of a method for determining whether a user has a right to receive scrambled channels in descrambled form can be described in reference to FIG. 1. Set top box 70 verifies the viewing privileges of viewer 92 by determining whether cable box 60 is enabled for descrambling particular scrambled channels of signal 50. Based on the descrambling capabilities of cable box 60, set top box 70 descrambles and displays to viewers only those scrambled channels that the viewer is authorized to receive. Because viewing privileges are subject to change when, for instance, the viewer upgrades or cancels cable services, it can be desirable to periodically repeat the process of determining the descrambling capabilities of cable box 60. For instance, this process can be repeated daily at an early morning hour, or at any other frequency.

To learn of the descrambling capabilities of cable box 60, set top box 70 causes the cable box to cycle through any or all scrambled channels and determines whether the output signal 50' from cable box 60 is descrambled. To illustrate, processor 20 of set top box 70 can control cable box 60 using an infrared (IR) transmitter 62, causing the cable box to tune to specified channels in signal 50. In response, cable box 60 tunes to the specified channel and descrambles it if the viewer is authorized to receive that channel. If the viewer is not authorized to receive the channel, cable box 60 tunes to the channel, but is unable to descramble it. Set top box 70 monitors the output signal 50' from cable box 60 to determine whether cable box 60 has descrambled the scrambled channel. The output signal 50' can be monitored as tuner 78 tunes to the cable box output channel associated with signal 50'. Signal 68 is transmitted to processor 20 or another component of set top box 70 to determine whether signal 68 is scrambled or descrambled. As described herein, the components of set top box 70 that can be used to cause cable box 60 to cycle through any scrambled channels and determine whether output signal 50' is descrambled represent an example of means for authenticating the right of a user to descramble a scrambled signal.

The foregoing process is repeated as cable box 60 cycles through as many as all of the scrambled channels in signal 50. Subject to further security techniques disclosed hereinbelow, the basic premise on which the authentication features of the invention rest is that set top box 70 is enabled to descramble a particular scrambled channel only if it has determined that cable box 60 has been able to descramble the same channel. Based on the results of the authentication process, processor 20 stored channel authorization information in storage medium 96 for later use in selectively enabling descrambler 80 of set top box 70.

Preferably, storage medium 96 stores the channel authorization information in a persistent form, such that it does not need to be generated each time set top box 70 is powered up. In this manner the persistently stored channel authorization information can be repeatedly used, if necessary, as a viewer turns the set top box 70 on and off. While persistent storage of the channel authorization information has the foregoing advantages, the invention also extends to embodiments wherein the channel authorization information is transiently stored and generated each time the set top box 70 is powered up.

After the authentication process has been completed, set top box 70 tunes to a channel requested by viewer 92 using tuner 78. Based on the channel authorization information contained in storage medium 96, processor 20 selectively enables descrambler 80 using control signal 98. If descrambler 80 is thereby enabled, the channel descrambled and displayed to the viewer on television 90. If, however, descrambler 80 is not enabled, the channel is not descrambled, thereby preventing the viewer from accessing the unauthorized channel.

C. Authentication Using Signal Synchronization

The foregoing process of determining the viewing privileges of viewer 94 can be successfully used and can adequately prevent viewer 94 from receiving unauthorized access to scrambled channels in most situations. According to one embodiment, however, the invention further employs additional security features for reducing the ability of viewers to tamper with the authentication process. For instance, one could imagine that a viewer might attempt to circumvent the authentication process by inputting to the set top box 70 a non-scrambled, ordinary channel in the place of a scrambled, premium channel during the authentication process as the set top box tests the ability of cable box 60 to descramble the premium channel. Potentially, set top box 70 could falsely interpret the non-scrambled channel as an indication that cable box 60 is capable of descrambling the scrambled premium channel. If this were to occur, the viewer might gain unauthorized access to the premium channel.

Figure 2:
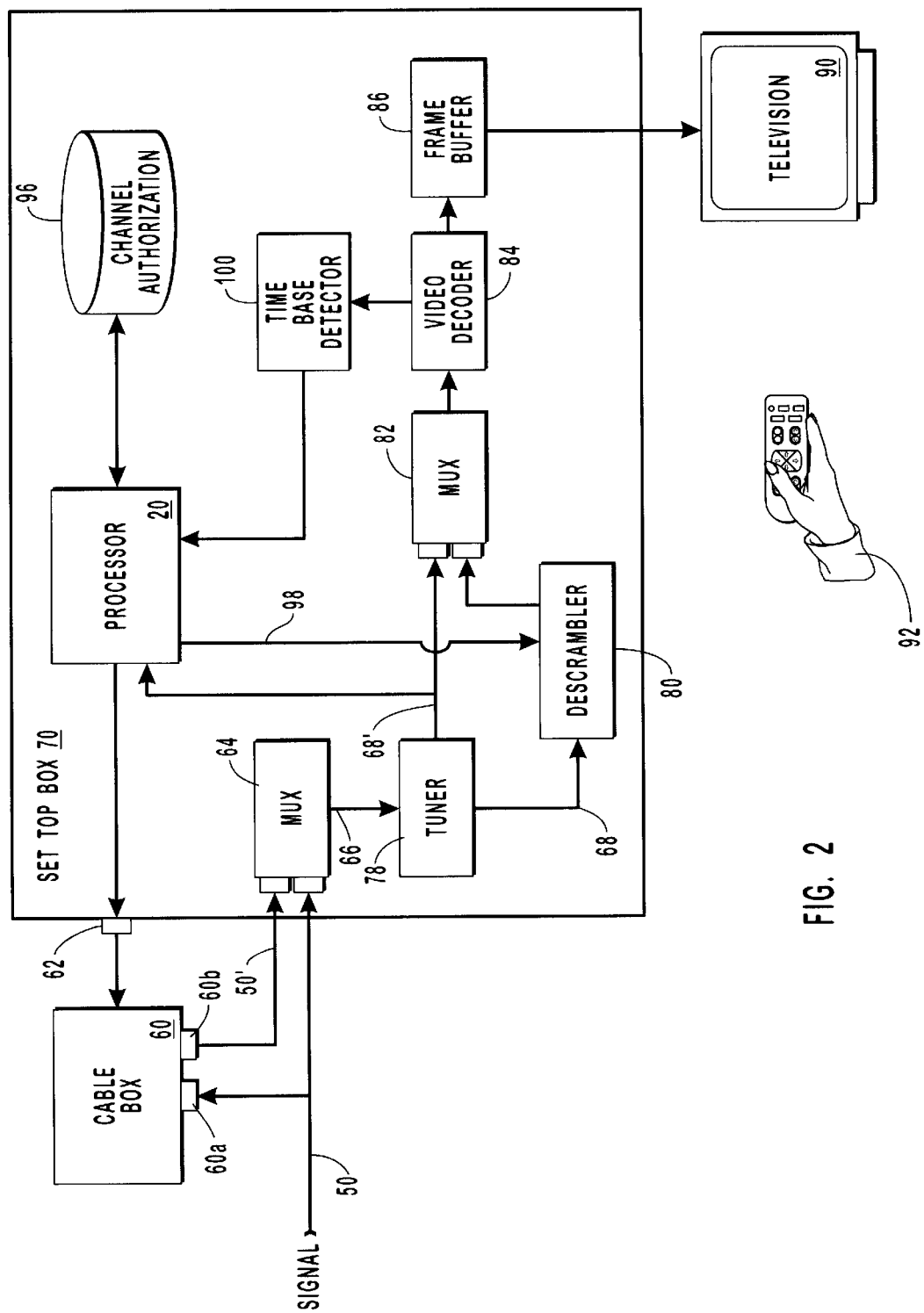
FIG. 2 is a block diagram depicting the system of FIG. 1 supplemented with components that compare the synchronization of a signal tuned and descrambled by the cable box with a signal tuned and descrambled by the set top box.

According to the embodiment illustrated in FIG. 2, set top box 70 measures the timing of the vertical blanking interval or another cyclical, repeating feature of the signal corresponding to a particular channel in order to substantially ensure that the channel being measured by set top box 70 during the authentication process is, in fact, the channel that the set top box intends to test. As used herein, the term "time base" represents the vertical blanking interval or any other cyclical feature of the signal. Because cable TV channels generally originate from independent sources referenced to independent master clocks, it can be assumed that they have independent time bases that drift relative to one another over time.

In this embodiment, the authentication process includes a two-pass technique that compares the time base of signal 50' (the "tested or unknown channel"), which supposedly or purportedly comes from cable box 60, with the time base of the channel received directly from the cable operator (i.e., the "known channel" included in signal 50). In other respects, the authentication process can be the same as that described above in reference to FIG. 1.

To measure the time base of the known channel, tuner 78 tunes to the known channel and descrambles the resulting signal 68 at descrambler 80. A time base detector 100 shown in FIG. 2 measures the timing of the vertical blanking interval or any other time base of signal 68. This known channel serves as the basis for measuring the synchronization of the time base of the tested channel.

To measure the time base of the tested channel, tuner 78 tunes to the output channel associated with cable box 60 as has been described herein in reference to the authentication process of FIG. 1. The resulting signal 68' is processed by time base detector 100 to measure the time base thereof, as well being analyzed by processor 20 to determine whether the signal is descrambled. The timing of the time base of signal 68' (the tested channel) is compared with the measured time base of the known channel. For example, time base detector 100, in conjunction with processor 20, can compare the synchronization of the tested channel and the known channel.

If the time bases of the channels are synchronized, it can be reasonably concluded that the tested channel is the same as the known channel, and that the viewer has not interfered with the authentication process. Thus, cable box 60 has been capable of descrambling the tested channel, and it is concluded that the viewer is authorized to receive the descrambled channel. Based on this conclusion, channel authorization information 96 is updated to enable descrambler 80 to descramble the channel. If, on the other hand, the time bases of the tested channel and the known channel are not synchronized, it is assumed that the channels are different, and that the viewer may have attempted to interfere with the authentication process. In this case, the authentication process may be repeated or channel authorization information 96 is updated to disable descrambler 80.

Figure 3:
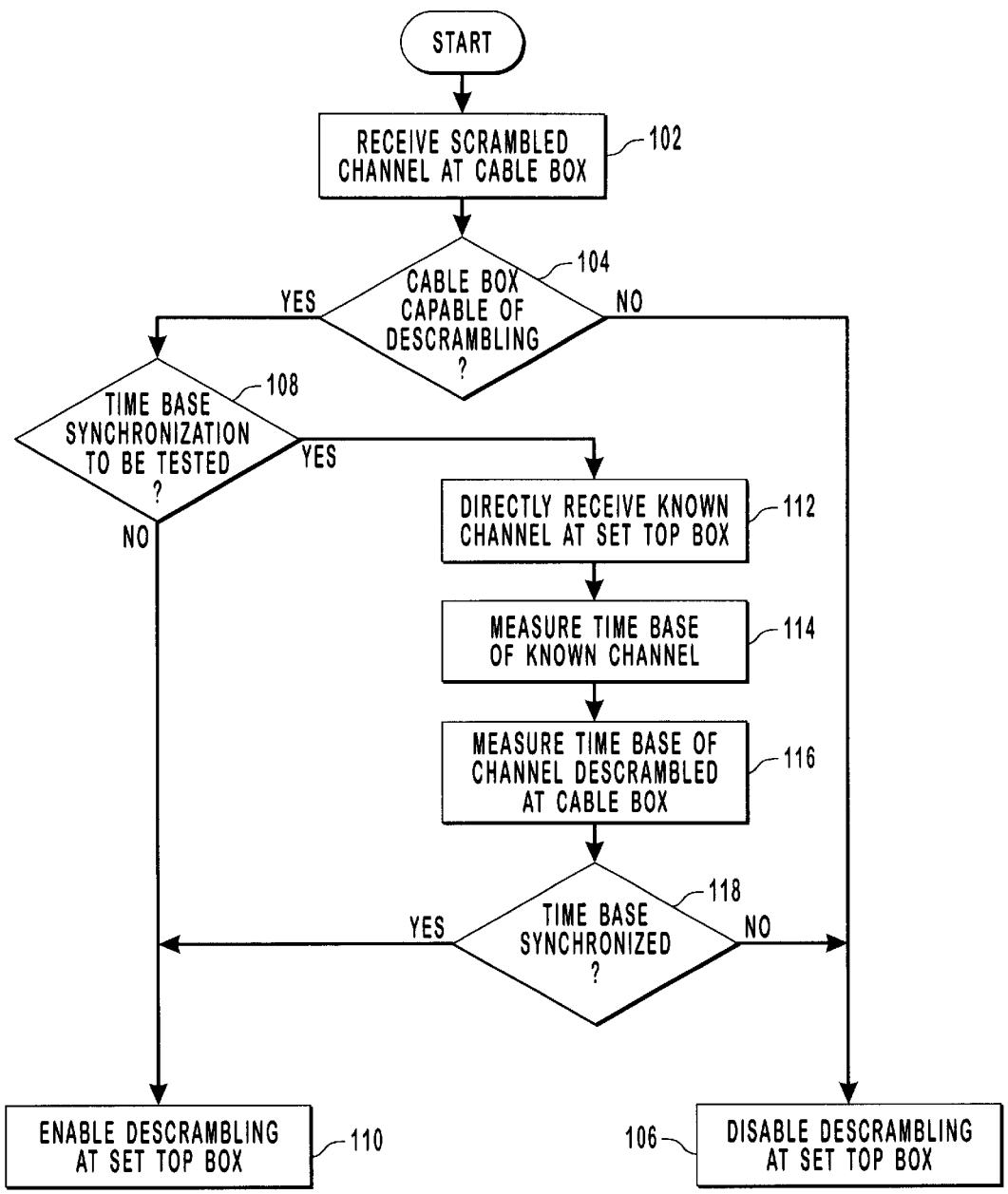
FIG. 3 is a flow diagram illustrating a method whereby a set top box uses the cable box to determine whether a viewer is authorized to access a specified channel.

The flow diagram of FIG. 3 summarizes the authentication processes described above. In step 102, the scrambled channel (i.e., the tested channel) is received at the cable box. The set top box determines, in decision block 104, whether the cable box is capable of descrambling the tested channel. If not, the viewer is not authorized to receive the channel, and the set top box is disabled from later descrambling this channel as shown in step 106.

If the cable box is capable of descrambling the tested channel, the process advances to decision block 108, where it is determined whether, as a further security measure, the time base synchronization of the tested channel is to be tested according to the techniques disclosed herein. If time base synchronization testing is not desired, the method proceeds to step 110, in which descrambling of the channel is enabled at the set top box.

If, however, time base synchronization testing is to be conducted, the method advances to step 112, in which the known channel is directly received at the set top box. The time base of the known channel is measured in step 114 and the time base of the tested channel is measured in step 116. If, according to decision block 118, the time bases are synchronized, the viewer is assumed to be authorized to receive the channel. Accordingly, descrambling of the channel is enabled at the set top box in step 110. If the time bases are not synchronized in decision block 118, the set top box is disabled from descrambling the channel in step 106. It is noted that the method of FIG. 3 can be repeated for any number of scrambled channels and can be periodically repeated to respond to any intervening changes in the authorization status of the viewer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A set top box for descrambling a scrambled signal comprising:
   means for receiving a scrambled signal;
   means for monitoring an output signal of a cable box that corresponds with the scrambled signal;
   means for authenticating a right of a user to descramble the scrambled signal based at least in part on whether the output signal of the cable box is scrambled or not scrambled;
   a tuner for tuning the scrambled signal; and
   a descrambler that is capable of descrambling the scrambled signal if the right of the user to descramble the scrambled signal is authenticated and that is capable of refraining from descrambling the scrambled signal if the right of the user to descramble the scrambled signal is not authenticated.

2. A set top box as defined in claim 1, wherein the means for receiving the scrambled signal comprises a multiplexor.

3. A set top box as defined in claim 2, wherein the multiplexor is capable of being connected to both the output signal of a cable box and the scrambled signal.

4. A set top box as in claim 1, wherein the means for authenticating further comprises a time base detector for measuring the synchronization of a time base of the scrambled signal with a time base of the output signal.

5. A set top box as defined in claim 4, wherein the time base of the scrambled signal and the time base of the output signal is the vertical blanking interval.

6. A set top box as defined in claim 1, further comprising a computer-readable medium having stored thereon channel authorization information generated by the means for monitoring an output signal of a cable box to authenticate the right of a user to descramble the scrambled signal, the channel authorization information being used by the set top box to selectively enable or disable the descrambler.

7. A set top box as defined in claim 6, wherein the channel authorization information is stored persistently on the computer-readable medium.

8. In a system having a cable box and a set top box, a method for selectively descrambling a scrambled channel at the set top box based on the right of a viewer to receive the scrambled channel in descrambled form, comprising the steps of:
   determining whether the cable box is capable of descrambling a scrambled channel;
   receiving the scrambled channel at the set top box;
   if the cable box has been capable of descrambling the scrambled channel, then descrambling the scrambled channel with the set top box; and
   if the cable box has not been capable of descrambling the scrambled channel, then refraining from descrambling the scrambled channel with the set top box.

9. A method as defined in claim 8, further comprising the steps of:
  determining whether the cable box is capable of descrambling each of one or more other scrambled channels;
  receiving one of the one or more other scrambled channels at the set top box;
  if the cable box has been capable of descrambling said one of the one or more other scrambled channels, then descrambling said one of the one or more other channels with the set top box; and
  if the cable box has not been capable of descrambling said one of the one or more other scrambled channels, then refraining from descrambling said one of the one or more other scrambled channels with the set top box.

10. A method as defined in claim 8, wherein the step of determining whether the cable box is capable of descrambling the scrambled chancel comprises the steps of:
  using the set top box, causing the cable box to tune to the scrambled channel; and
  using the set top box, monitoring an output signal from the cable box to determine whether the output signal is descrambled.

11. A method as defined in claim 8, wherein the scrambled channel is included in a scrambled signal that further comprises a plurality of other scrambled channels.

12. A method as defined in claim 11, further comprising the step of examining an output signal of the cable box for each scrambled channel in the scrambled signal to determine if the output signal is scrambled or descrambled.

13. A method as defined in claim 8, further comprising the step of tuning to the scrambled channel at the set top box.

14. A method as defined in claim 8, further comprising the step of allowing a viewer to view the scrambled channel in descrambled form.

15. A method as defined in claim 8, wherein each step or determining whether the cable box is capable of descrambling a scrambled channel is repeated periodically.

16. A method as defined in claim 8, wherein the step of determining whether the cable box is capable of descrambling a scrambled channel is repeated daily.

17. A method as defined in claim 8, further comprising the steps of:
  storing a descrambling algorithm at the set top box; and
  receiving an upgrade of the descrambling algorithm, wherein the upgrade is used in the step of descrambling the scrambled channel.

18. A method as defined in claim 8, further comprising the steps of:
  identifying a scrambling technique that has been used to scramble the scrambled channel; and
  receiving a descrambling algorithm compatible with the scrambling technique from a remote source, the descrambling algorithm being used in the step of descrambling the scrambled channel.

19. A computer program product comprising one or more computer-readable media having computer-executable instructions for implementing the method recited in claim 8.

20. In a system having a cable box and a set top box, a method for determining whether a user has a right to view a scrambled channel in descrambled form, the method comprising the steps of:
  receiving the scrambled channel at the set top box without the scrambled channel passing through the cable box;
  detecting a first time base of the scrambled channel at the set top box;
  receiving a channel to be tested at the set top box, the channel to be tested purportedly being the scrambled channel that has been descrambled at the cable box;
  detecting a second time base of the channel to be tested at the set top box;
  comparing the first time base with the second time base;
  concluding that the user has the right to view the scrambled channel in descrambled form if the first time base matches the second time base; and
  concluding that the user does not have the right to view the scrambled channel in descrambled form if the first time base does not match the second time base.

21. A method as defined in claim 20, wherein the step of detecting the first time base further comprises the steps of:
  tuning the set top box to the scrambled channel; and
  measuring a vertical blanking interval of the scrambled channel.

22. A method as defined in claim 20, wherein the step of detecting the second time base further comprises the steps of:
  tuning the cable box to the channel to be tested; and
  measuring a vertical blanking interval of the channel to be tested.

23. A method as defined in claim 20, further comprising the steps of:
  receiving a user request to tune to the scrambled channel and to descramble the scrambled channel;
  if the first time base matches the second time base, descrambling the scrambled channel at the set top box; and
  if the first time base does not match the second time base, refraining from descrambling the scrambled channel at the set top box.

24. A method as defined in claim 20, further comprising the step of repeating the steps of detecting the first time base and detecting the second time base.

25. A computer program product comprising one or more computer-readable media having computer-executable instructions for implementing the method recited in claim 20.

26. In a system having a cable box and a set top box, a method for descrambling a scrambled channel, the method comprising the steps of:
  receiving the scrambled channel at the set top box;
  receiving an output signal at the set top box, the output signal being received from the cable box;
  determining whether a user has a right to receive the scrambled channel in descrambled form based at least in part on whether the output signal received from the cable box is scrambled or not scrambled;
  if it is determined that the user has the right to receive the scrambled channel in descrambled form, then descrambling the scrambled channel with the set top box; and
  if it is determined that the user does not have the right to receive the scrambled channel in descrambled form, then refraining from descrambling the scrambled channel.

27. A method as defined in claim 26, wherein the step of determining whether a user has a right to receive the scrambled channel in descrambled form further comprises the steps of:
  determining if the output signal is scrambled;
  if the output signal is in scrambled form, then determining that the user does not have the right to receive the scrambled channel in descrambled form; and if the output signal is not in scrambled form:
    detecting, with the set top box, a first time base of the scrambled channel;
    detecting, with the set top box, a second time base of the output signal;
    comparing the first time base to the second time base;
    if the first and second time base match, then determining that the user has the right to receive the scrambled channel in descrambled form; and
    if the first and second time base do not match, then determining that the user does not have the right to receive the scrambled channel in descrambled form.

28. A method as defined in claim 27, wherein the scrambled channel and the output channel are the same channel.

29. A method as defined in claim 26, wherein the step of determining whether the user has the right to receive the scrambled channel in descrambled form further comprises the steps of:
    under control of the set top box, tuning the cable box to a plurality of scrambled channels, including said scrambled channel and other scrambled channels;
    examining each channel tuned by the cable box with the set top box to determine which of the plurality of scrambled channels are descrambled by the cable box;
    for each channel that is descrambled by the cable box:
        determining that the user has the right to receive the particular scrambled channel in descrambled form; and
        enabling the set top box to descramble the particular scrambled channel; and
    for each channel that is not descrambled by the cable box:
        determining that the user does not have the right to receive the particular scrambled channel in descrambled form; and
        disabling the set top box from descrambling the particular channel.

30. A method as defined in claim 29, wherein the step of tuning the cable box to a plurality of scrambled channels further comprises the step of periodically causing the cable box to cycle through each of the plurality of scrambled channels.

31. A method as defined in claim 29, wherein the step of examining each channel tuned by the cable box is repeated periodically.

32. A computer program product comprising one or more computer-readable media having computer-executable instructions for implementing the method recited in claim 26.

33. A computer program product for implementing a method for descrambling a scrambled channel, the computer program product comprising:
    a computer readable medium carrying computer-executable instructions for implementing the method wherein the computer-executable instructions comprise:
        program code means for causing a cable box to output one or more channels;
        program code means for examining whether each channel output by the cable box is scrambled or descrambled;
        program code means for descrambling, with the set top box, each channel the cable box is capable of descrambling; and
        program code means for refraining from descrambling each channel the cable box is not capable of descrambling.

34. A computer program product as defined in claim 33, wherein the computer-executable instructions further comprise program code means for periodically examining whether the one or more channels output by the cable box are scrambled or descrambled.

35. A computer program product as defined in claim 33, wherein the computer-executable instructions further comprise:
    program code means for obtaining a first time base of the scrambled channel received at a set top box;
    program code means for obtaining a second time base of the output channel of the cable box;
    program code means for comparing the first time base with the second time base;
    program code means for descrambling the scrambled channel at the set top box if the first and second time bases match; and
    program code means for refraining from descrambling the scrambled channel at the set top box if the first and second time bases do not match.

\* \* \* \* \*